United States Patent [19]

Koneke

[11] Patent Number: 5,650,080
[45] Date of Patent: Jul. 22, 1997

[54] ELECTRIC HEATING ATTACHMENT FOR DEICING THE REST ZONE OF A WINDSHIELD WIPER

[76] Inventor: Walter Koneke, 15 Buffin La., Blue Point, N.Y. 11705

[21] Appl. No.: 409,693

[22] Filed: Mar. 24, 1995

[51] Int. Cl.⁶ ............................ B60L 1/02; H05B 3/06
[52] U.S. Cl. ............................. 219/203; 219/522
[58] Field of Search ........................ 219/202–203, 219/522, 549, 528–529

[56] References Cited

U.S. PATENT DOCUMENTS

| | | | |
|---|---|---|---|
| 3,757,087 | 9/1973 | Bernard | 219/549 |
| 4,213,028 | 7/1980 | Wolf | 219/203 |
| 4,251,712 | 2/1981 | Parr | 219/203 |
| 4,488,033 | 12/1984 | Trachtenberg | 219/522 |
| 4,504,732 | 3/1985 | Bube et al. | 219/202 |
| 4,808,799 | 2/1989 | Schave | 219/203 |
| 4,847,472 | 7/1989 | Koontz | 219/522 |
| 5,386,098 | 1/1995 | Knudsen | 219/203 |
| 5,408,068 | 4/1995 | Ng | 219/202 |
| 5,463,203 | 10/1995 | Moore | 219/202 |

Primary Examiner—Teresa J. Walberg
Assistant Examiner—Sam Paik
Attorney, Agent, or Firm—Alfred Walker

[57] ABSTRACT

An electric heating attachment adds heating elements to the interior of the windshield to prevent the buildup of ice under the rest zone of the windshield wipers. The accessory plugs into the vehicle cigarette lighter socket. A heat imparting strip is positioned in the vicinity of the vehicle's windshield wipers to prevent ice accumulation. The heating elements concentrate a predetermined limited amount of electric heating on the rest area of the windshield wipers, to prevent the accumulation of ice thereto.

1 Claim, 4 Drawing Sheets

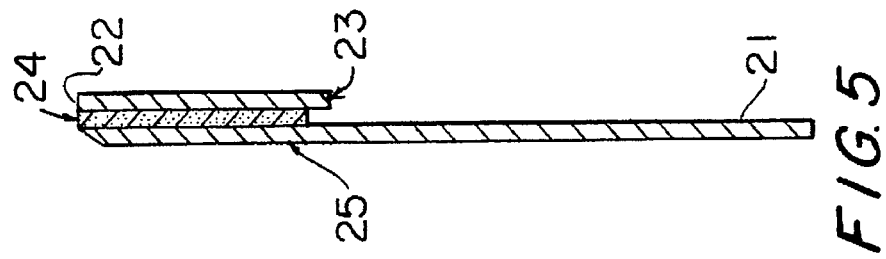
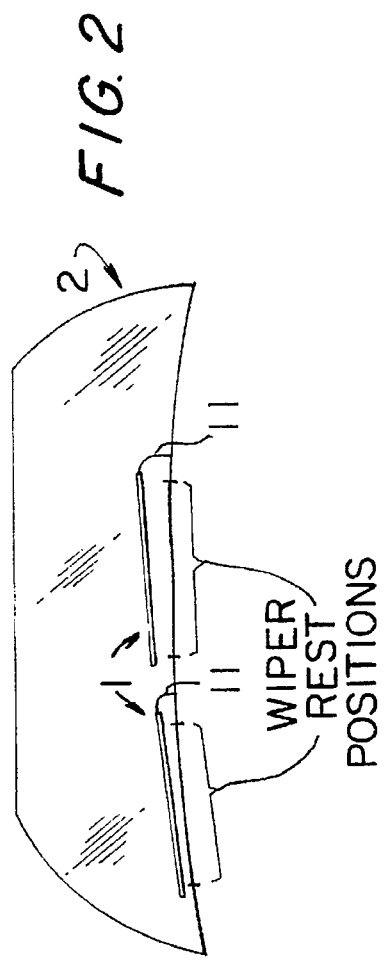
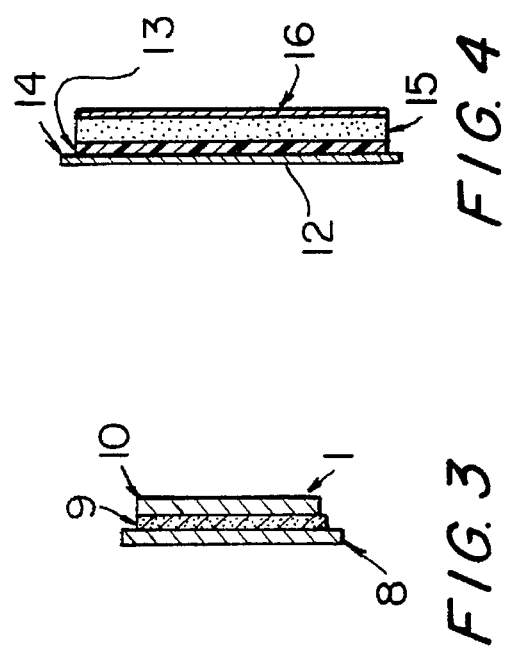

ELECTRIC HEATING ATTACHMENT FOR DEICING THE REST ZONE OF A WINDSHIELD WIPER

FIELD OF THE INVENTION

The present invention relates to an aftermarket kit to add heating elements to an interior of a motor vehicle windshield to prevent the buildup of ice under the rest zone of the windshield wipers. The kit is designed for installation by persons without special knowledge of vehicle electrical systems. The accessory is therefore designed to plug into the vehicle cigar lighter socket. No direct wiring or modification to the vehicle electrical system is required. The kit is designed to be effective on a wide variety of vehicles.

BACKGROUND OF THE INVENTION

The prior art concerns deicers in which a heat imparting strip is positioned in the vicinity of a vehicle's windshield wipers to prevent ice accumulation.

U.S. Pat. Nos. 4,109,133 of Hanle, 4,373,130 of Krasborn, 4,378,484 of Kunert and 5,173,586 of Gold are of interest regarding the placement of heating elements in the vicinity of a windshield wiper's rest position.

U.S. Pat. Nos. 3,934,111 of Roselli, 4,004,126 of Boaz and 4,513,196 of Bartelson are included as additional examples of patents directed to apparatus for heating a front windshield of a vehicle.

U.S. Pat. Nos. 3,757,087 of Bernard, 4,213,028 of Wolf and 4,399,347 of Schmitt are of interest for their disclosure regarding heating elements which can be added to a window after initial vehicle assembly.

However, the above noted patents have significant drawbacks and disadvantages.

In the Bernard and Roselli patents the devices both use a grid system covering the windshield side to side. These are windshield defrosters and make no claim to be able to stop ice build up under the wipers. In fact the grid does not go below the wiper blades.

In contrast to this prior art, the present invention makes that feature. It uses a simple thin strip held to the inside of the glass by clear plastic tape and it can be plugged into any car lighter. It is put on below the area one would look out of, because it is not intended to help keep the upper portion of the windshield clean, but only to keep ice from building up under wiper blades.

In the Boaz patent the device uses hot air to defrost the windshield. But drawing FIG. 2 therein notes hot air going up onto the window not under wipers. Also there are only two openings, one on each side of the dash, which would not be able to melt all the ice that would build up under the wipers.

Here again the deicer of the present invention would be better because it goes all the way across the lower portion of the windshield under wipers, and can be adjusted unlike the Boaz patent which is fixed.

In the Hanle et al and Wolf patents, there are provided rear defrosters using a grid.

In the Krosborn patent the device heats the area where wipers rest into an opaque ceramic material on the inner or outer side of the glass.

In contrast the deicer strip of the present invention is placed under wipers so build up can not start, and is less costly to install.

In the Kunert patent, a costly device has to be bonded to glass.

In the Schmit patent a device is placed over the whole window, and again is used for defrosting the windshield not for ice build ups under wipers. It could be a safety hazard if it came off.

In the Bartelson patent there is also designed a grid setting with wires embedded in a panel and is used for defrosting of windshield and not for build up of ice under wipers.

In the Gold patent there is described a heating device attached to an outside of windshield, using a sealant to keep it in place and water tight. It also talks about adjusting the wipers. In contrast the present invention needs no tools to install, is easy to install on windshields, and plugs into a car lighter and prevents ice build up.

OBJECTS OF THE INVENTION

It is therefore an object of the invention of the present invention to provide an after-market kit for de-icing the portion of a motor vehicle windshield below the position of rest for windshield wipers, to prevent ice build-up thereat.

It is also an object to provide a simple de-icer device which avoids the need for providing a windshield grid or sealant which could obstruct vision, and which does not need special bonding to a windshield.

It is yet another object to improve over the disadvantages of the prior art.

SUMMARY OF THE INVENTION

The principal objective of the de-icer strip of the present invention is to concentrate a limited amount of electric heating on the area of interest. In some vehicles this is easier than on others because of the design of the windshield, wipers, dash and attachment of the glass to the cowling area behind the dashboard.

DESCRIPTION OF THE DRAWINGS

The present invention can best be described in conjunction with the accompanying drawings, in which:

FIG. 2 is a front elevational view of the de-icer as in FIG. 1.

FIG. 3 is a cross-sectional view of the heating element thereof.

FIG. 4 is a cross-sectional view of the heat insulating tape thereof.

FIG. 5 is a cross-sectional view of the exterior heat conductor thereof.

DETAILED DESCRIPTION OF THE DRAWINGS

Figure 1B:
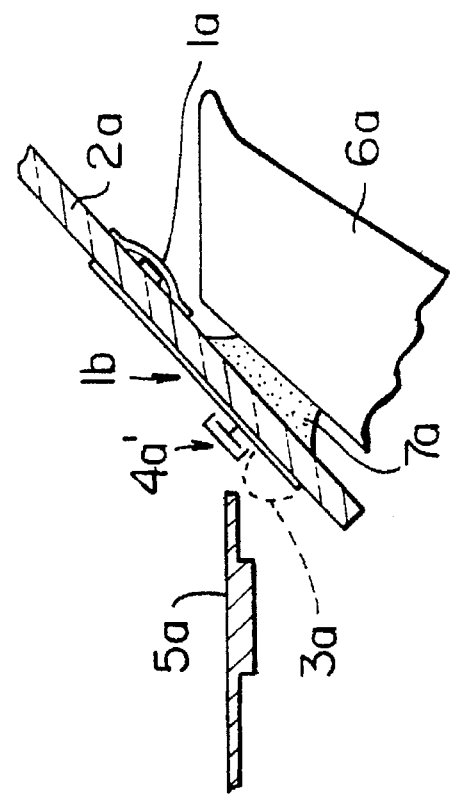
FIG. 1B is a side sectional view of another embodiment of a de-icer.
Figure 1A:
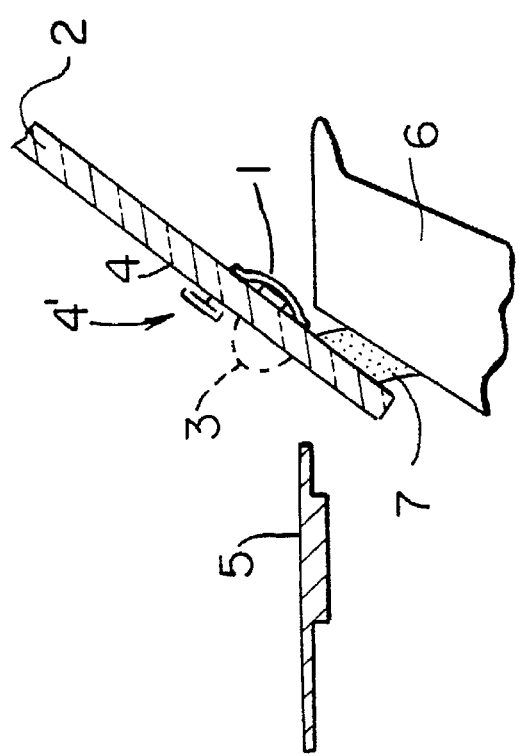
FIG. 1A is a side sectional view of one embodiment of a de-icer.

FIG. 1A shows the relationship of the de-icer accessory heating element 1 with respect to elements typical of older autos as well as the current design of many sports/utility vehicles or pickup trucks. The key feature here is that the windshield zone portion which is zone prone to build-up of ice under the rest position of the windshield wipers is high enough so that a heating element can be attached to the interior of the glass immediately behind it. In this case, the heating element 1 is attached as shown inside windshield 2

3 to prevent ice buildup at zone 3 below wiper rest zone $4^1$ of wiper 4 beyond hood 5 of an automobile. Heating element 1 is placed on an interior side of windshield 2 above dashboard 6, and above pre-existing sealant located between windshield 2 and dashboard 6.

In FIG. 1B, the relationship is such that the heating element 1a cannot be easily positioned between windshield 2a and dashboard 6a behind the potential ice dam buildup at zone 3a at wiper rest zone box 4a. In this case, an exterior heat conductor layer 1b is used to efficiently couple the heat flowing through the thickness of the windshield 2a downward to the wiper rest zone $4a^1$ of wiper 4a as shown, to prevent ice buildup at zone 3a below wiper 4a, beyond hood 5a of an automobile. Likewise, heating element 1a is installed above pre-existing sealant 7a between windshield 2a and dashboard 6a.

FIG. 2 shows the lateral positioning of heating elements 1 directly in registration with the rest position $4^1$ of the wipers 4,4.

FIG. 3 shows the lateral positioning of heating element 1 as shipped in the kit. It consists of three layers: a backing paper layer 8 (or release layer), an adhesive layer 9, and resistive metal foil 10. The length of each heating element 1 is about 20 inches and the resistance is such that about 60 watts of power is dissipated. At 12 volts vehicle voltage, this produces 2.4 ohms.

A length of two conductor insulated cord 11 is factory attached at one end of heating element 1. Resistive layer 10 is either a single or multiple trace foil similar to that described by Bernard in U.S. Pat. No. 3,757,087. Adhesive 9 is a high temperature type in a thin layer and it has good bonding to glass.

Another item supplied in the kit is an insulating tape 12 shown in cross section in FIG. 4. It is a four layer substrate with an insulating layer 13 of some flexible high temperature material, such as silicone foam rubber, with release backing paper 14 and adhesive 15 on one side and a final backing 16 of metal foil with a shiny low emissivity outer surface on the other side.

To install heating element 1, the user cleans the inside attachment area of windshield 2 with alcohol and then attaches heating element 1 in the appropriate position behind windshield 2. Wire leads 17, 18 of heating element 1 are then trimmed and the ends are stripped of insulation for connection to wire leads 19, 20 of junction box cord 11. Then backing paper 15 is removed from insulating tape 12. Tape 12 is then placed on heating element 1, effectively sealing the heat to the windshield 2. Heating element 1 is installed as flat as possible to windshield 2 to minimize any modification of the normal windshield defroster air flow.

If the installation is of the type shown in FIG. 1B, an extra step must be done. A layer of thick metal foil 21 is attached to the exterior of the windshield such that its top edge 22 lines up with the heating element 1 on the interior of windshield 2. This metal foil 26 can be trimmed with ordinary scissors to fit any obstacles on the exterior of windshield 2. It is required only under the wiper rest position 4a. It also has a release layer (backing paper) 23 which has to be removed to expose adhesive layer 24. Adhesive layer 24 as shown in FIG. 5, is a thick heat conductive variety with good weathering characteristics and adhesion to clean glass. Front surface 25 of metal foil 21 is covered with a high temperature non-stick layer eg. Teflon-Duponte. Front surface layer 25 will aid in the removal of snow or slush from the surface of windshield 2.

Figure 6:
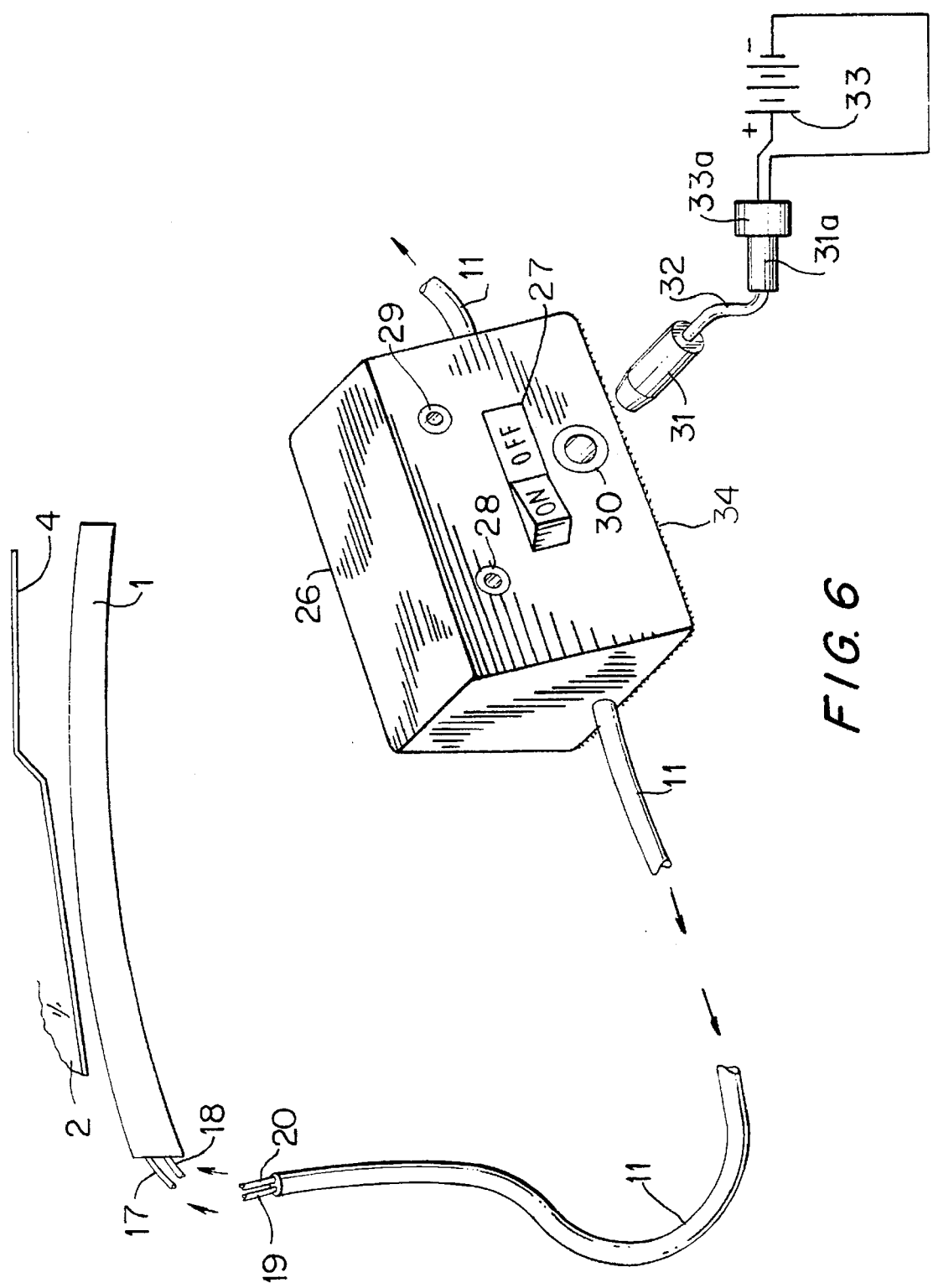
FIG. 6 is a perspective view of a control box thereof.

FIG. 6 shows control/junction box 26 which box 26 is a plastic housing which contains the control electronics, an on/off switch 27, two light emitting diodes 28, 29, and a jack 30 for insertion of extension cord connector 31 of extension cord 32 therein. Extension cord 32 has an opposite connector 31a insertable into conventional cigarette or cigar lighter 33a connectable to conventional car battery 33. Control/junction box 26 also has internal terminals for electrical connection of two heater elements 1,1. Junction box 26 has an adhesive layer 34 that can be exposed by removing a release liner on bottom surface 35 of junction box 26 for attachment to dashboard 6 between two heater elements 1,1. Extension cord 32 can be conveniently removed and stored in the glove box during seasons when the heater accessory is not in use.

One problem with devices plugged into a cigarette lighter for powering from the vehicle electrical battery 33 is that this source is not switched off when the ignition key is turned off and removed, and it is always "hot" Any item plugged in, if forgotten in an on position, would continue to drain battery 33 even when the vehicle is unattended. To help remind the user that the accessory is on, a red "power-on" light emitting diode 28 is used. Because this accessory is such a high power device, about 120 watts, a second feature is used to insure that it soon would shut itself off when the vehicle is turned off. This feature includes voltage drop detector and control system 36 attached to turn-on delay 38 and turn-off delay 39. It has this latter function as well as the function of alerting the user that the drain on the vehicle electrical system 33 may be excessive at times, thereby suggesting that the unit should be turned off.

Figure 7:
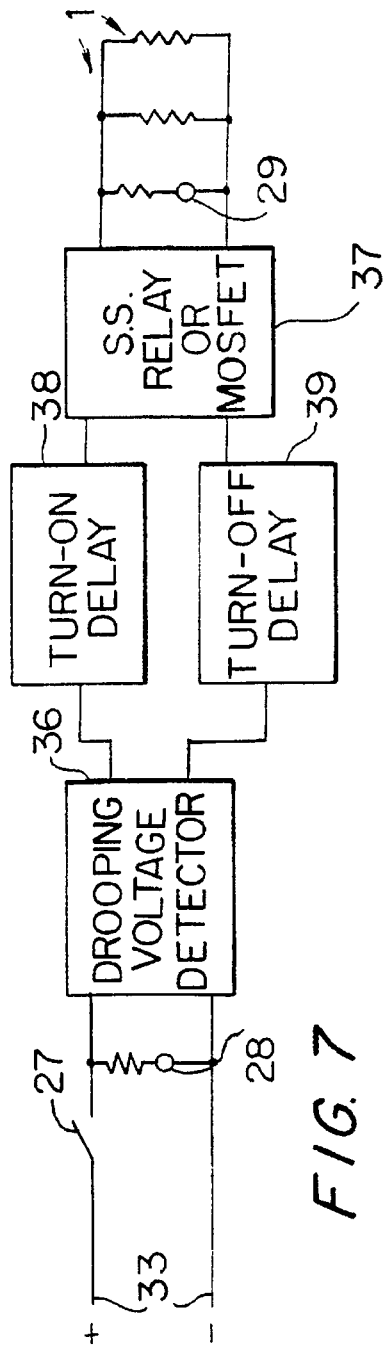
FIG. 7 is a block diagram thereof.
Figure 8:
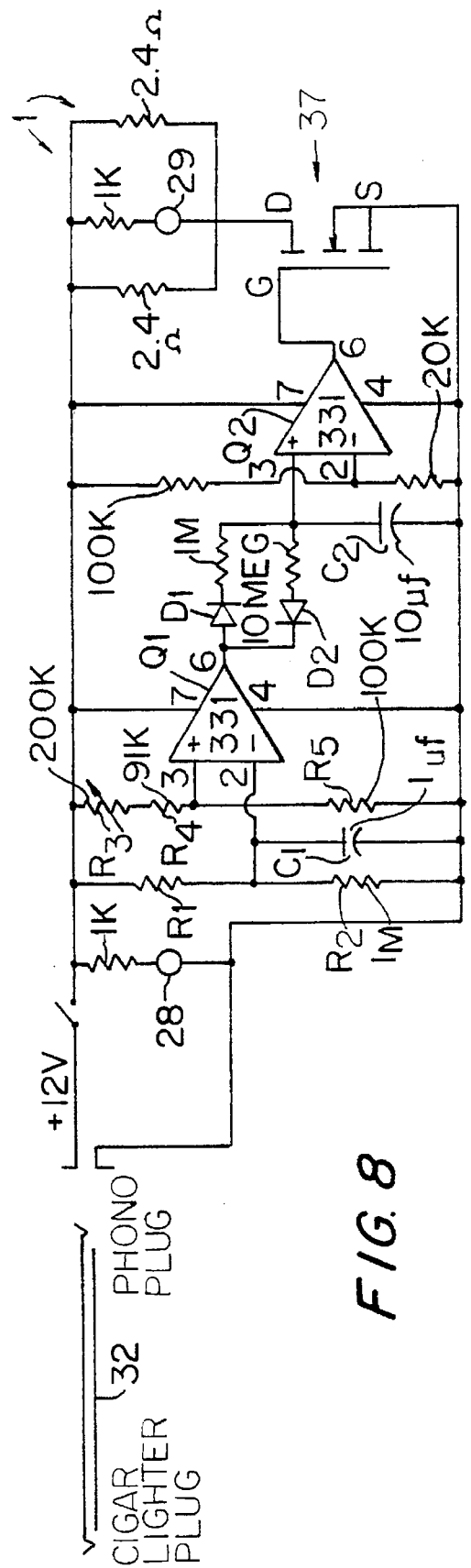
FIG. 8 is an electrical circuitry diagram thereof.

FIG. 7 shows a block diagram. The functions can be implemented as either digital or analog circuit elements. FIG. 8 shows an analog circuit implementation. Normally, in an operating vehicle the voltage varies a small amount as the various electrical loads switch on and off or the voltage regulator adjusts the alternator output. Voltage drop detector 36 detects situations when the voltage is decreasing, even slightly. This starts a timing element which waits a preset amount of time, about one minute, before turning off the heater elements. If the voltage increases before this time-out, detector 36 resets the time-out timer and heater elements 1,1 are never turned off during this interval. If the time-out interval is exceeded before there is an increase in voltage, heater elements 1,1 will be shut down by action of the solidstate relay or MOSFET 37 (metal oxide semiconductor field effect transistor). Green light emitting diode 29 (LED) is wired in parallel with heater elements 1,1 to indicate to the driver that something turned heater elements 1,1 off. If the red LED 28 is still on, this indicates that it wasn't the on/off switch which turned heater elements 1,1 off. If it were, the drain from heater elements 1,1 that causes the voltage to continuously droop, and the voltage would immediately increase when heater elements 1,1 are shut down, thereby reseting the timer. If it weren't for turn-on delay, it would immediately turn heater element 1,1 back on, which could be unbeknown to the driver that this action is going on. With turn-on delay 38, green LED 29 blinks off for about one full second in such a situation. Thus if the driver notices frequent blinks of green LED 29, the driver should turn off on/off switch 27 for a while to give the electrical system, perhaps one with a weak battery or alternator, a chance to recover for a while.

FIG. 8 shows a circuit diagram using two analog type TL331 voltage comparators. Other analog as well as digital circuits can be used to accomplish the same results. A resistor bridge circuit consisting of R1, R2, R3, R4 and R5 is connected to the input of the first comparator, Q1. A 1 uf capacitor, C1, is connected across one of the resistors in the bridge. R3 is a factory adjusted trimmer resistor which is set so that the output of Q1 just switches low (at pin 6) when the input voltage is reduced monotonically at a slow rate (such as 1 volt per hour). In this way, if the ignition is shut off, Q1 would switch to the low position output. C1 causes a delay in the circuit such that pin 2 of Q1 is always comparing past voltages ("about a second ago") than pin 2, the voltage must have dropped. Now if the output of Q1 switches to a low (about 1.5 volts), C2 which had been charged to about 10 volts begins discharging through the 10 meg resistor and D2. This takes about 150 seconds to dip below the 1.9 volts at pin 2 of Q2. If pin 6 of Q1 switches back to "HIGH" during this interval (because the voltage increased), there is no effect on the output. On the other hand, if pin 3 of Q2 dips below the voltage at pin 2 of Q2, the output of Q2 (pin 6) will switch low thereby turning off the output MOSFET which turns off both heaters as well as the green LED indicator. When an increasing voltage is detected by the Q1 comparator, Q1 pin 6 switches high thereby charging C2 through diode D1 and the 1 meg resistor. When the voltage on C2 exceeds the pin 2 of Q2 voltge (about 1 second), Q2 output (pin 6) will switch high thereby turning on the MOSFET which controls the heaters and the green indicator. Thus, the turn-on delay is controlled by 1 meg ohm resistor and C2 while the turn-off delay is controlled by the 10 meg ohm resistor and C2.

It is noted that other modifications may be made to the present invention, without departing from the scope of the appended claims.

I claim:

1. An electrical heating attachment for de-icing a rest zone of a windshield wiper of a vehicle having a battery system, comprising:

at least one heating element attachable to an interior of a motor vehicle windshield at a resting zone of at least one windshield wiper of the vehicle, said at least one heating element connectable to a vehicle electrical system by a plug insertable into a vehicle cigar lighter socket;

said at least one heating element being a heat imparting strip positionable in the vicinity of the resting zone of the windshield wipers to prevent ice accumulation thereat;

an exterior heat conductor layer connectable to the windshield in the vicinity of said heating element to efficiently couple the heat flowing through the thickness of the windshield downward to the resting zone area of the at least one windshield wiper;

said at least one heating element including a backing release layer, an adhesive layer, and a resistive metal foil;

said at least one heating element being connectable to an insulated cord at one end thereof;

said layer of resistive metal foil attachable to the exterior of the windshield such that its top edge lines up with said at least one heating element on the interior of the windshield at a wiper rest position of the at least one windhsield wiper, a voltage drop detector, said voltage drop detector detecting when the voltage is decreasing, said voltage drop detector communicating with a timing element for turning off said at least one heating element, wherein further, if the voltage increases before a predetermined amount of time said voltage drop detector resets a timer to maintain said at least one heating element in an on position during said predetermined interval of time, wherein further if a predetermined time-out interval is exceeded before there is an increase in voltage, said at least one heating element is shut down by action of a relay;

a light emitting diode indicating that said at least one heating element is in an off position; and a control box having a plurality of analog voltage comparators, a resistor bridge circuit consisting of a plurality of resistors connectable to an input of a first comparator of said plurality of comparators, a capacitor connectable across one of said resistors in said resistor bridge, wherein a further resistor is set so that an output of said first compartor switches low when an input voltage is reduced automatically at or above a predetermined slow rate, wherein said capacitor causes a delay in the circuit and further wherein if an output of said capacitor switches to a low voltage, said capacitor begins discharging, wherein further if said compartor is responsive to turning off said relay, which said relay turns off said at least one heating element.

* * * * *